US005167998A

United States Patent [19]

Hato et al.

[11] Patent Number: 5,167,998

[45] Date of Patent: Dec. 1, 1992

[54] POSTCARDS AND REPLY POSTCARDS FOR CONFIDENTIAL PURPOSES

[75] Inventors: Nobuhiro Hato, Higashikurume; Etsujiro Ikeda, Yokohama, both of Japan

[73] Assignees: Sanyo-Kokusaku Pulp Co., Ltd.; Kyokuetsu Cooperation Co., Ltd., both of Tokyo, Japan

[21] Appl. No.: 565,724

[22] Filed: Aug. 13, 1990

[30] Foreign Application Priority Data

Aug. 14, 1989 [JP] Japan ................................ 1-207871
Dec. 4, 1989 [JP] Japan ................................ 1-313544

[51] Int. Cl.[5] ................................ B32B 3/02

[52] U.S. Cl. ................................ 428/77; 229/92.3; 229/92.8; 283/105; 283/106; 281/2

[58] Field of Search ................ 229/92.3, 92.8; 428/77; 283/105, 106

[56] References Cited

U.S. PATENT DOCUMENTS 4,885,198 12/1989 Kimura ................................ 428/77
4,938,506 7/1990 Matsuguchi et al. ............... 283/105
4,955,640 9/1990 Anderson ................................ 281/2

*Primary Examiner*—Patrick J. Ryan
*Assistant Examiner*—Kam F. Lee
*Attorney, Agent, or Firm*—Oblon, Spivak, McClelland, Maier & Neustadt

[57] ABSTRACT

Postcards and reply postcards for confidential purposes of a structure in combination comprising an S- or Z-folding, continuous postcard form having on at least one major side a first region to bear an address and second regions to bear confidential information, one of said second regions being folded back onto the back side of said first region along a line and the other of said second regions being folded back onto said one region along a line on the middle portion of and between said second regions and a Z-folding continuous postcard form is designed for mailing information and a third region being folded back onto said one region along a folding line is designed for a reply, and such postcard form is prepared in a continual form so as to be printed both addresses of the addressees and items of his confidential information at the same time by a printer connected to a computer thereby to ensure the right entry of information and a third region, if any, being printed the addresses and names of addressors and as a mean to temporarily bond the second region with a laminated sheet assembly to be inserted between the regions, and adhesive sheet inserted between the back sides of said first region and said one of said second regions so that they are bonded together.

12 Claims, 5 Drawing Sheets

POSTCARDS AND REPLY POSTCARDS FOR CONFIDENTIAL PURPOSES

BACKGROUND OF THE INVENTION

1. Field of the Invention

The present invention relates to a postcard for confidential purposes comprising a three-folded postcard form having on at least one major side a first region to bear an address and second regions to bear items of confidential information, said second regions being folded in two along a line located on the middle portion of and between second regions; a laminated sheet assembly for temporarily bonding together said second regions; and an adhesive sheet for bonding together the back sides of said first region and one of said second regions which is adjacent to said first region through a folding line. The present invention also relates to a reply postcard for confidential purposes comprising a postcard in a combination form consisting of a Z-folding postcard form having on at least one major side a first region to bear an address and second regions to bear items of confidential information, one of said second regions being folded back onto the back side of said first region along a folding line and the other of said second regions being folded back onto said one second region along a folding line located at the middle portion of and between said second regions and a reply postcard form defining a third or reply region contiguous to the other of said regions a folding line along which it is folded back onto the back side of said other second region. The first and second regions and the third region, if any, can be printed at the same time by means of a printer such as a computer laser printer, and the second regions can be separated off when printed.

2. Statement of Prior Art

Heretofore, sealed letters have been used as communications means in such cases where ensuring privacy is a primary problem. However, the sealed letters are dearer than postcards in at least postage fees, leading to increased demand toward means for lowering the cost. A problem with less costly postcards, however, is that the information is exposed to others' views. For annunity payment notices in particular, it is strongly desired in view of ensuring recipients' privacy that they can never be exposed to those other than recipients. This is also true of various documents sent from banking facilities, insurance companies, stockbrokers and taxation offices as well as of electrical, gas, water, telephone and other rates bills and overdue notices. For such documents, it is also increasingly required that they are never exposed to the eyes of persons other than the individuals concerned.

In recent years, documents prepared in various fields incidental to services and mailed from banking facilities and taxation offices to the electrical, gas, water and telephone enterprises, for the most part, have been mainly printed with computer-aided printers. Usually, they have been mailed to the recipients in letter forms so as to ensure their privacy. However, there is a rise in the mailing cost with time-consuming enveloping, sealing and other works. In view of ensuring privacy, it has more recently been envisaged and put in practice to apply on the information-bearing side of a postcard a seal having a releasable, low-adhesive mass on its back side in order to conceal the information. In using such an adhesive seal, however, it is required that release paper applied for protection of the low adhesive layer be removed there from prior to applying the seal on the information-bearing side of a postcard. For those who use large quantities of postcards, this poses a problem that a large amount of released papers should be disposed. Another problem is that the information-bearing sides of postcards are vulnerable to be torn out when they are unsealed by the recipients. Still another problem is that any sufficient effect upon preventing an invasion of privacy is not achieved, because the low adhesive mass is bondable and releasable repeatedly without leaving any trace of peeling.

As set forth in Japanese Utility Model Laid-Open No. 64(1989)-16368, a postcard has been proposed, which has an adhesive agent applied along the periphery of its back side at a suitable width with a seal perforated in a position corresponding to the adhesive agent. A problem with this postcard, however, is that the amount of the information to be printed is much limited since nothing can be printed on its adhesive-carrying portion. As set forth in Japanese Utility Model Laid-Open No. 63(1988)-11863, there is also available a postcard having on its back side a laminated sheet consisting of seven layers in all, i.e., a seal assembly consisting of five layers in all, viz., a substrate provided on its surface side with an aluminaized layer and provided on its back side with a low-density polyethylene cover film laminated with a low-density polyethylene and a high-density polyethylene film with a binder layer located therebetween, said binder layer being formed by hot-extruding a low-density polyethylene of the same type of which said low-density polyethylene film is formed at a temperature lower than the usual melting point of said low-density polyethylene, followed by solidifiation, and a release paper provided on said low-density polyethylene film through a pressure-sensitive adhesive layer. Problems with this postcard, however, are that the laminated sheet used for it is a complicated assembly of a seven-layer structure and that, as already mentioned, large quantities of release papers to be later disposed of are left. Another problem is that because it is designed to bear items of confidential information on its one side alone, some limitations are had as to the amount of information to be born and the scope of use of it. Still another problem arises out of this postcard which is designed to print an address on its front side and information on its back side. In other words, it is necessary to ensure whether it is rightly addressed with the right information on its back.

Further, such postcards so far available are of the "one-way" type. When the recipients have doubts about the items of confidential information written thereon, therefore, they will have to use separate postcards or letters for making inquiries.

The present invention has for its object to provide a solution to the above problems.

SUMMARY OF THE INVENTION

According to an aspect of the present invention, there is provided a postcard for confidential purposes comprising in combination:

an S- or Z-folding, continuous postcard form having on at least one major side a first region to bear an address and second regions to bear items or confidential information, one of said second regions being folded back onto the back side of said first region along a line and the other of said second regions being folded back onto said one region along a line located on the middle portion of and between said second regions and a Z-folding continuous postcard form is designed for mailing information and a third region which is located farthermost from the first region being folded back onto said one region along a folding line is designed for a reply, and such continuous postcard form is prepared in a continual form so as to be printed both addresses of the addressees and items of his confidential information at the same time by a printer connected to a computer thereby to ensure the right entry of information in which the right items of confidential information are printed related to the right addressee to double the amount of information to be printed, and a third region, if any, being printed the addresses and names of addressors so as to avoid trouble of entering addresses and names in reply, and as a mean to temporarily bond the second region for confidential information with a laminated sheet assembly to be inserted between the regions, said laminated sheet assembly being consisted of a transparent plastic sheet having a melting point of 120° C. or higher and a transparent plastic material melt-extruded on one side of said plastic sheet, said plastic material having a melting point of 110° C. or higher and lower than that of said plastic sheet and showing a T-peel strength of 10 to 70 g/50 mm with respect to said plastic sheet, as measured at 20° C., and RH of 65% and a peel rate of 300 mm/min. and two heat-sensitive adhesive layers provided on the two sides of said laminated sheet, each of said layers showing a T-peel strength of 300 g/50 mm or higher with respect to said plastic sheet, said plastic material and said postcard form combination, as measured at 20° C., an RH of 65% and a peel rate of 300 mm/min. and being thermally bondable to said postcard form combination at a temperature of 100° C. or lower, said laminated sheet assembly being inserted between said second regions, so that said regions are temporarily bonded by thermal bonding, and adhesive sheet inserted between the back sides of said first region and said one of said second regions so that they are bonded together.

BRIEF DESCRIPTION OF THE DRAWINGS

Preferred embodiments of the postcard and reply postcard in accordance with the present invention will now be described, by way of example, with reference to the accompanying drawings in which.

DETAILED EXPLANATION OF THE INVENTION

Figure 1:
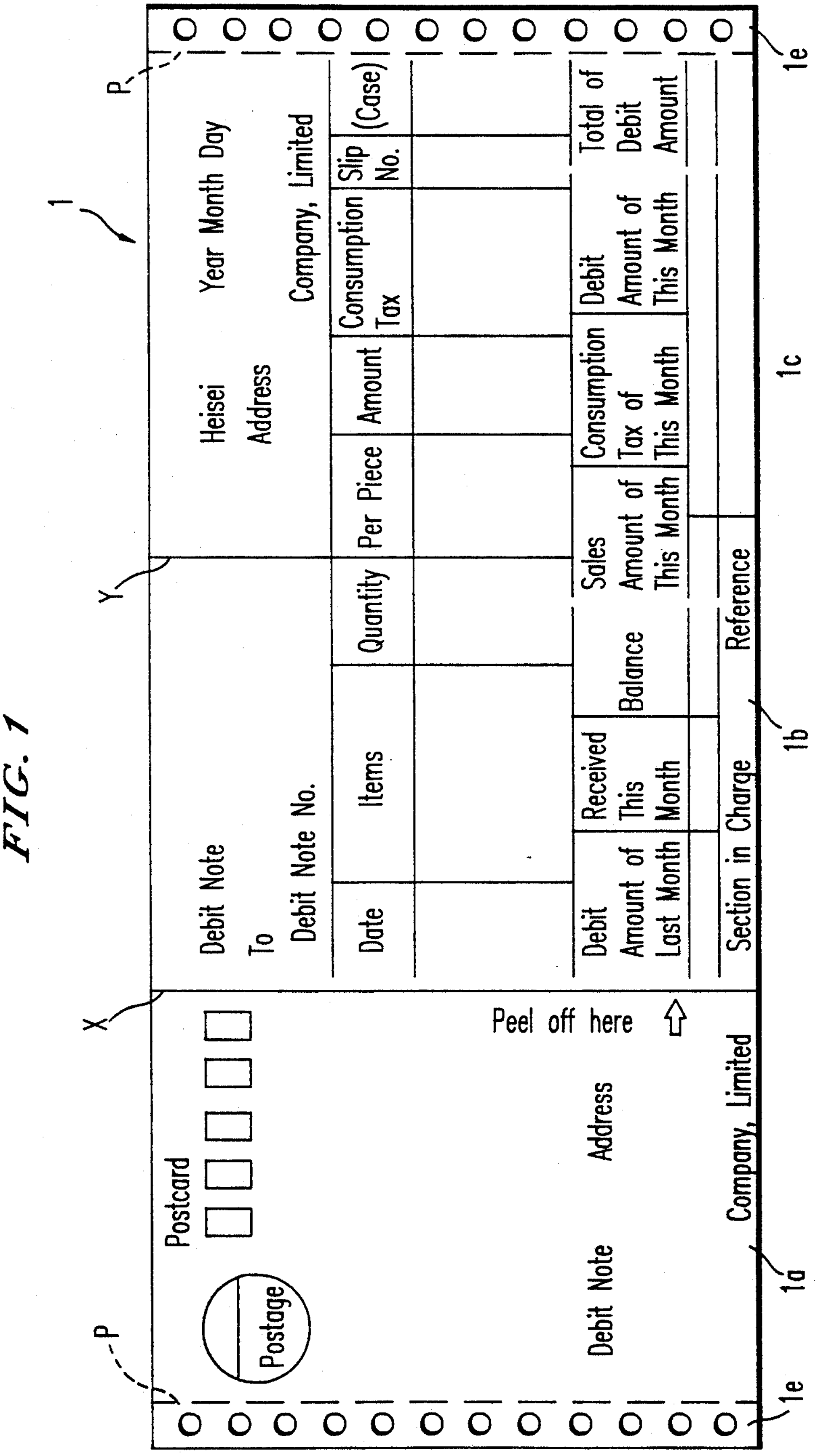
FIG. 1 is a front view of one embodiment of the postcard form according to the first aspect of the present invention.
Figure 2:
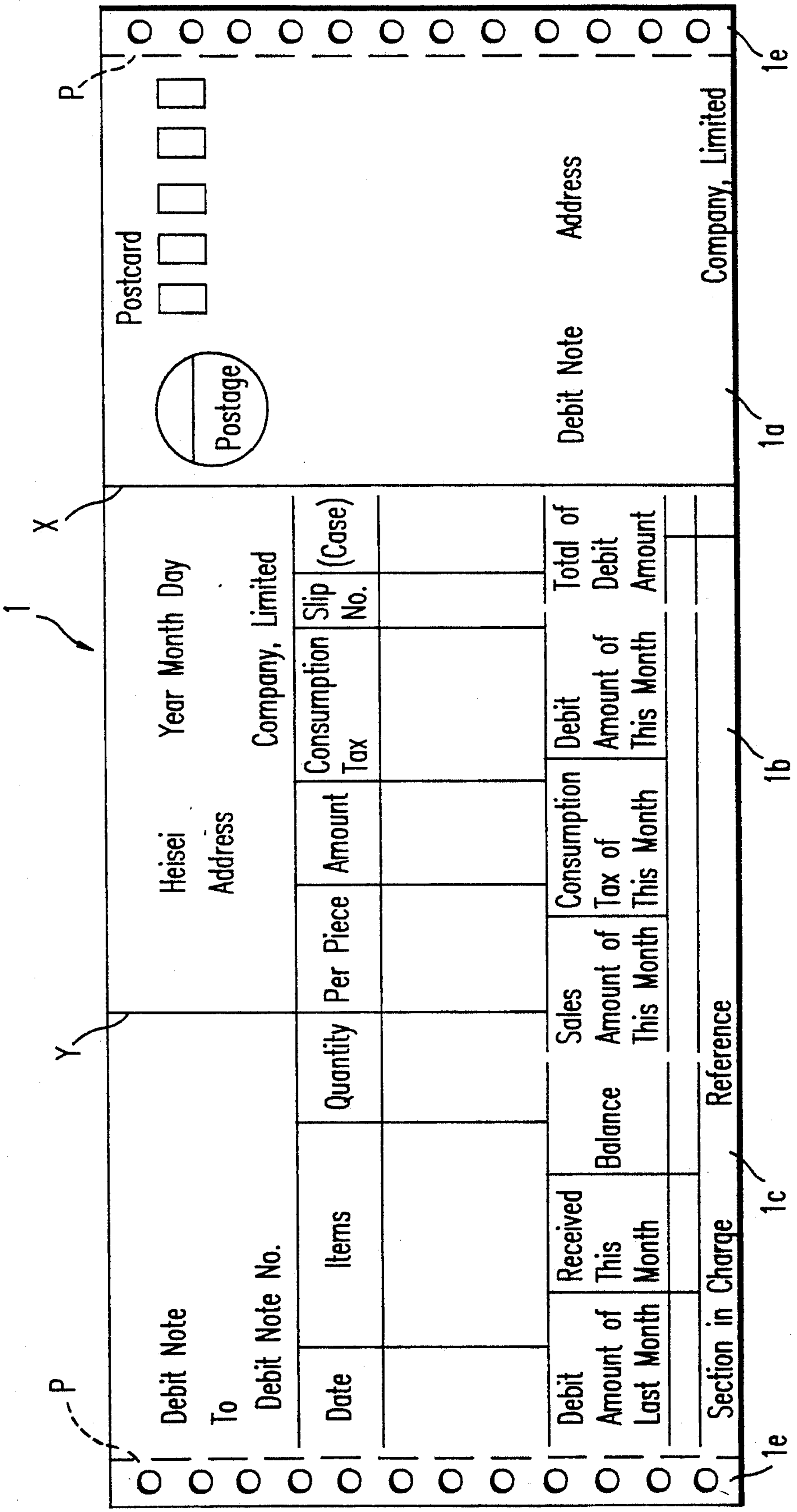
FIG. 2 is a front view of another embodiment of the postcard form according to the first aspect of the present invention.

With reference to FIGS. 1 and 2, there are illustrated two embodiments of the "one-way" postcard for confidential purposes, generally shown at 1. This postcard is defined by a Z-folding (FIG. 1) or S-folding (FIG. 2), continuous postcard form having on at least one major side a first region 1*a* to bear an address and second regions 1*b*, 1*c* to bear items of confidential information, one (1*b*) of said second regions 1*b*, 1*c* being folded back onto the back side of said first region 1*a* along a folding line X and the other 1*c* of said second regions 1*b*, 1*c* being folded back onto said one region 1*b* along a folding line Y located on the middle portion of and between said second regions 1*b* and 1*c*. The postcard form 1 should be of the size provided for in the postal regulations. For instance, it may be of a maximum size between 140 mm×90 mm and 150 mm×107 mm, as measured after Z- or S-folding and its weight may be determined in consideration of its area, say, at most 115 g/m$^2$ for the smallest area and at most 55 g/m$^2$ for the largest area.

Figure 3A:
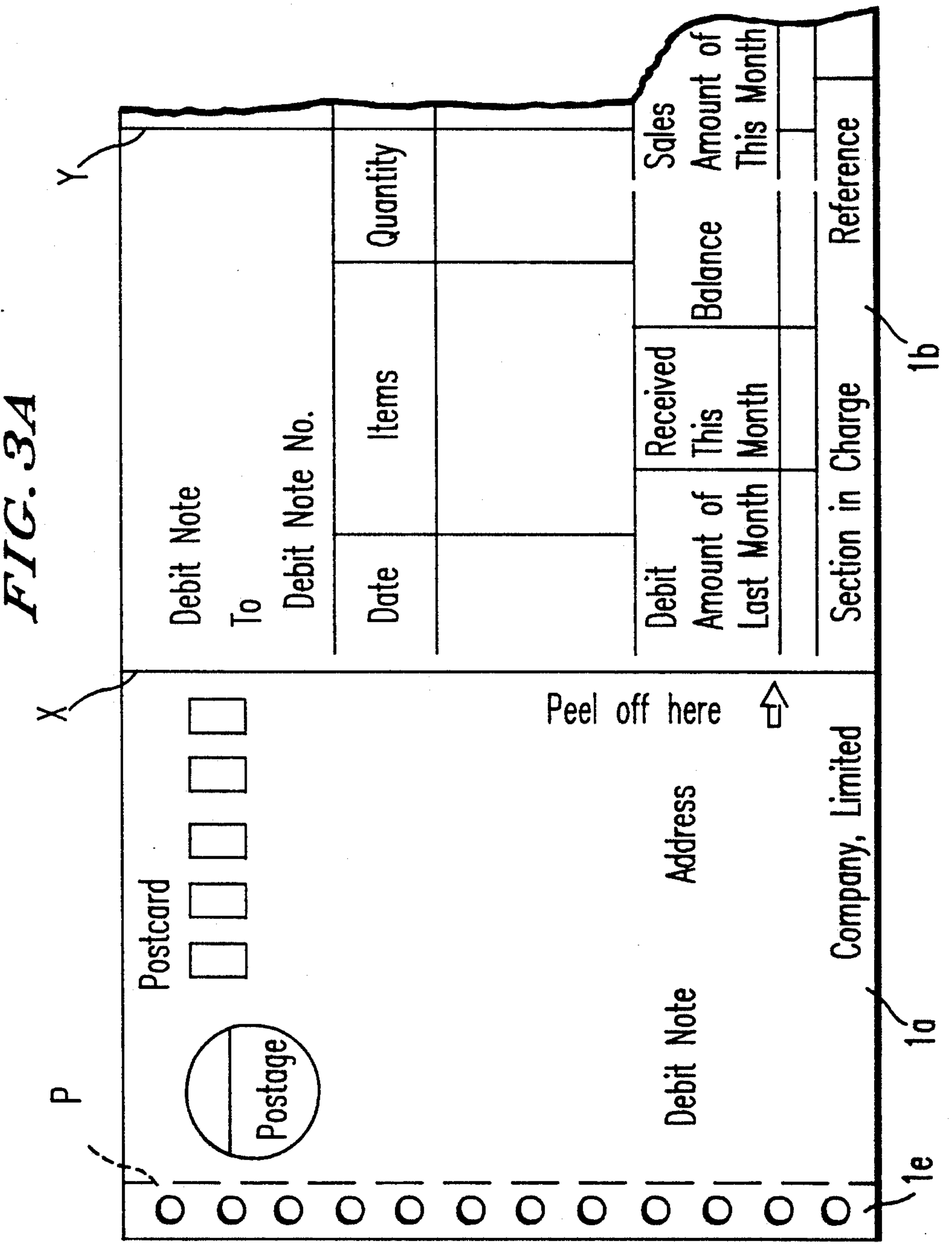
FIG. 3 is a front view of one embodiment of the reply postcard form combination according to the second aspect of the present invention.
Figure 3B:
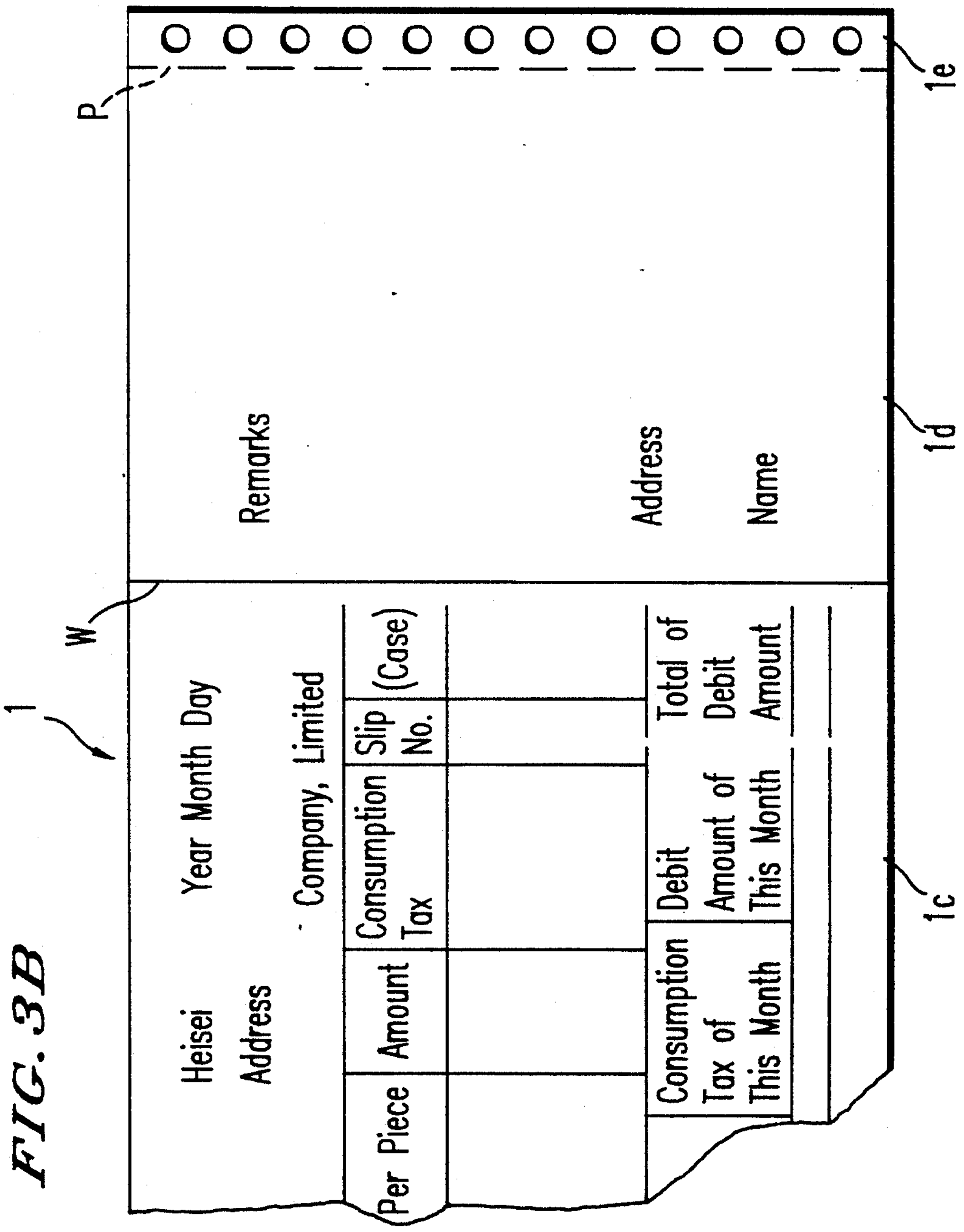

With reference to FIG. 3, there is illustrated an embodiment of the postcard form combination comprising a Z-folding postcard form and a reply postcard form defined by a third or reply region 1*d* contiguous to the region 1*c* of said postcard form through a line W along which it is folded back onto the back side of the region 1*c*. The postcard form combination should be of the size laid down in the postal regulations. For instance, it may be of a maximum size between 140 mm×90 mm and 150 mm×107 mm, as measured after the reply region 1*d* has been folded back onto the back side of the region 1*c* along the folding line W following Z-folding, and its weight may be determined in consideration of its area, say, 160–190 g/m$^2$ for the smallest area and 125–140 g/m$^2$ for the largest area. In order to print at once an address and the items of required confidential information and an addressor, if any, on the first region 1*a* and the second regions 1*b*, 1*c* and on the reply region 1*d*, if any, by means of a printer such as a computer laser printer, it is preferred that ear regions 1*e*, each having a line of equally spaced small holes, are attached to both sides of the postcard form or postcard form combination 1 through perforations P.

Figure 4:
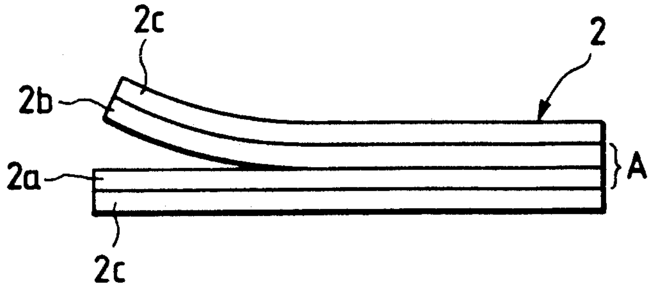
FIG. 4 is an enlarged view in section of the structure of the laminated sheet assembly used in the present invention.
Figure 5:
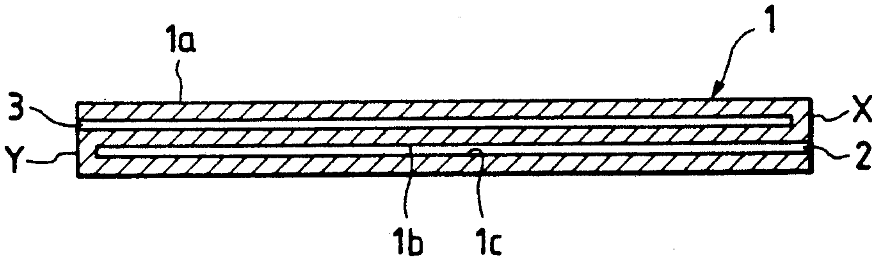
FIG. 5 is a sectional view showing the structure of the postcard illustrated in FIG. 1.
Figure 6:
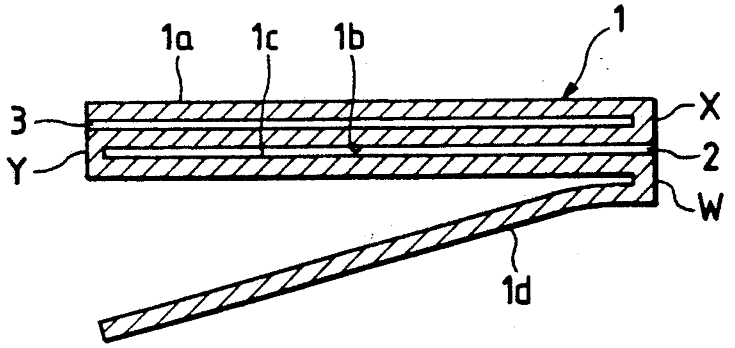
FIG. 6 is a sectional view showing the structure of the reply postcard form combination illustrated in FIG. 3.

As illustrated in FIG. 4, a laminated sheet assembly 2 of a four-layer structure includes a temporarily bonded, laminated sheet A consisting of a transparent plastic sheet 2*a* having a melting point of 120° C. or higher and a transparent plastic material 2*b* melt-extruded on one side of said plastic sheet 2*a*, said plastic material 2*b* having a melting point of 110° C. or higher and lower than that of said plastic sheet 2*a* and showing a T-peel strength of 10 to 70 g/50 mm with respect to said plastic sheet 2*a*, as measured at 20° C., an RH of 65% and a peel rate of 300 mm/min.—this peel strength permits said plastic material 2*b* to be easily releasable by hand but remains sticked to said plastic sheet 2*a* until the postcard reaches the recipient—and two heat-sensitive adhesive layers 2*c* provided on the two sides of said laminated sheet A, each of said layers 2*c* showing a T-peel strength of 300 g/50 mm or higher with respect to said plastic sheet 2*a*, said plastic material 2*b* and said postcard form 1, as measured at 20° C., an RH of 65% and a peel rate of 300 mm/min. and being thermally bondable to said postcard form 1 at a temperature of 100° C. or lower, said laminated sheet assembly 2 being inserted between said second regions 1*b* and 1*c*, so that said regions 1*b* and 1*c* are temporarily bonded together by thermal bonding. For the laminated sheet A forming a part of the laminated sheet assembly 2, the transparent plastic sheet 2*a* may be formed of any one of polyethylene terephthalate, polypropylene and acetate, while the transparent plastic material 2b may be made of an ethylene/ethyl acrylate copolymer and/or an ethylene/vinyl acetate copolymer, or a mixed resin of an ethylene/ethyl acrylate copolymer and/or an ethylene/vinyl acetate copolymer with polyethylene. Particular preference is given to a mixed resin of 5 to 35% by weight of an ethylene/ethyl acrylate copolymer and/or an ethylene/vinyl acetate copolymer with 95 to 65% by weight of polyethylene, since good processability and the desired T-peel strength are then achievable. As set forth in the aforesaid Japanese Utility Model Laid-Open No. 63-11863, however, the transparent plastic sheet 2a and the transparent plastic material 2b may be formed of a high-density polyethylene or polyethylene terephthalate sheet and low-density polyethylene, respectively.

As the transparent heat-sensitive adhesive layers 2c provided on both sides of the laminated sheet A, having a T-peel strength of at least 300 g/50 mm with respect to the plastic sheet 2a, plastic material 2b and postcard form 1, as measured at 20° C., an RH of 65% and a peel rate of 300 mm/min. and thermally bondable to the postcard form 1 at a temperature of 100° C. or lower, use may be made of any material such as those based on acrylic materials, ionomers and copolymers of vinyl chloride/vinyl acetate, ethylene/vinyl acetate, ethylene/acrylic acid, styrene/butadiene/styrene, styrene/isoprene/styrene and styrene/ethylenebutylene/styrene.

As illustrated, an adhesive sheet 3 is inserted between the back sides of said first region 1a and said one 1b of said second regions 1b, 1c so that they are bonded together.

When it is intended to provide the postcard's recipient with the items of confidential information by peeling the adhesive sheet off the back sides of the regions 1a and 1b, it may be formed of the same material of which the laminated sheet assembly 2 is formed. However, it is otherwise preferable to use a sheet having on its both side the same materials of which the transparent heat-sensitive adhesive layers 2c are formed, since the back sides of the regions 1a and 1b can then be completely bonded together by thermal bonding through adhesive sheet 3 inserted therebetween, when the laminated sheet assembly 2 is inserted between the second regions 1b and 1c to temporarily bond them together by thermal bonding.

Thus, the postcard for confidential purposes according to the present invention is constructed from an S- or Z-folding, continuous postcard form 1 having on at least one major side a first region 1a to bear an address and second regions 1b, 1c to bear items of confidential information, one 1b of said second regions 1b, 1c being folded back onto the back side of said first region 1a along a folding line X and the other 1c of said second regions 1b, 1c being folded back onto said one region 1b along a folding line Y located on the middle portion of and between said second regions 1b and 1c. While the postcard form 1 is not folded up along the folding lines X and Y, the first region 1a and the second regions 1b, 1c lie on the same plane, so that an address and confidential items of information can be set down at once on the first region 1a and the second regions 1b, 1c, respectively, said second regions having an area two times as large as an ordinary postcard. Since the address and information are set down on the same plane, it is unlikely that the postcard may be addressed wrongly.

The reply postcard for confidential purposes according to the present invention is constructed from a postcard form combination consisting of a Z-folding postcard form and a reply postcard form defining a third or reply region 1d contiguous to the other 1c of said regions through a folding line W along which it is folded back onto the back side of said other region 1c. When it is not folded up along the folding lines X, Y and W, the first region 1a, the second regions 1b, 1c and the third region 1d lie on the same plane, an address, items of confidential information and an addressor can be set down at once on the first region 1a, the second regions 1b, 1c with the area being twice as large as an ordinary postcard, and the third region 1d.

With a printer such as a computer laser printer, printing will be able to be made simultaneously on the first region 1a and the second regions 1b, 1c and the third region 1d, if any. Such printing with a printer may be further expedited, if the ear regions 1e are connected to both sides of the postcard form or postcard form combination through the perforations P. After printing, the first region 1a is first folded back onto the back side of the second region 1b along the folding line X, and the second regions 1b and 1c are folded in two along the center folding line Y. Where the third or reply region 1d exists, it may or may not be folded back on the back side of the other second region 1c along the folding line W. In this manner, the postcard form or postcard form combination 1 is folded up.

When the postcard form or postcard form combination is folded up in this manner, there are inserted between the second regions 1b and 1c the laminated sheet assembly 2 including the temporarily bonded, laminated sheet A consisting of the transparent plastic sheet 2a having a melting point of 120° C. or higher and a transparent plastic material 2b melt-extruded on one side of said plastic sheet 2a, said plastic material 2b having a melting point of 110° C. or higher and lower than that of said plastic sheet 2a and showing a T-peel strength of 10 to 70 g/50 mm with respect to said plastic sheet 2a, as measured at 20° C., an RH of 65% and a peel rate of 300 mm/min. and the two heat-sensitive adhesive layers 2c provided on the two sides of said laminated sheet A, each of said layers 2c showing a T-peel strength of 300 g/50 mm or higher with respect to said plastic sheet 2a, said plastic material 2b and said postcard form 1, as measured at 20° C., an RH of 65% and a peel rate of 300 mm/min. and being thermally bondable to said postcard form 1 at a temperature of 100° C. or lower, and between the back sides of the first region 1a and the one second region 1b, the adhesive sheet 3 for bonding them together preferably at a temperature lower than 100° C. is inserted. Then, heating is carried out at a temperature sufficient to melt the transparent heat-sensitive adhesive layers 2c of the laminated sheet assembly 2 from the front side of the first region 1a and the back side of the other second region 1c in the case of the postcard form according to the first aspect of the present invention; from the front side of the first region 1a and the back side of the other second region 1c in the case of the postcard form combination according to the second aspect of the present invention and when the third region 1d is not folded back along the folding line W; and from the front sides of the first region 1a and the third region 1d when the third region 1d is folded back, thereby temporarily bonding the front sides of the second regions 1b and 1c with the laminated sheet assembly 2, and at the same back sides of a first region 1a and a second region 1b are bonded together with adhesive sheet 3. When the ear regions 1e, each having a line of equally spaced small holes, exist on both sides of the postcard form or postcard form combination 1, they may be removed along the perforations P.

The above explanation has been made with reference to a specific embodiment wherein the adhesive sheet 3 is formed of a material showing adhesion at a temperature at which the transparent heat-sensitive adhesive layers 2c on both sides of the laminated sheet assembly 2 is thermally bondable to the front sides of the second regions 1b and 1c of the postcard form or postcard form combination 1. When the adhesive sheet 3 is formed of a material thermally fused to the postcard form or postcard form combination 1 at a temperature of 100° C. or higher, such as a single-layer film of polyethylene, however, the postcard form or postcard form combination 1 may be folded up to engage the back sides of the first region 1a and the one second region 1b through the folding line X, rather than to engage the front sides of the second regions 1b and 1c with each other through the folding line Y. Then, the adhesive sheet 3 is inserted between the back sides of the first region 1a and the one second region 1b and heating is carried out from their front sides at a temperature sufficient to fuse the adhesive sheet 3 to their back sides. Afterwards, the postcard form or postcard form combination 1 is folded up along the folding line Y to engage the front sides of the second regions 1b and 1c with each other and the laminated sheet assembly 2 is inserted therebetween. Finally, heating is carried out from the front side of the first region 1a and the back side of the other second region 1c at a temperature sufficient to thermally bond the adhesive layers 2c to the front sides of the second regions 1b and 1c.

When printing is made simultaneously on the first region 1a, the second regions 1b, 1c and the third region 1c of the postcard combination 1 with a printer such as a computer laser printer, it is preferable to use for the adhesive sheet 3 a material showing heat-sensitive adhesion at a temperature of 100° C. or lower. This is because the back sides of the first region 1a and the one second region 1b or the front sides of the second regions 1b and 1c can be thermally bonded together at a temperature of 100° C. or lower with the adhesive sheet 3 and the laminated sheet assembly 2, so that it is possible to prevent the resin contained in the toner from being melted by heating and making prints illegible.

EXAMPLES

The present invention will now be explained specifically but not exclusively with reference to the following examples and comparative example.

EXAMPLE 1

A transparent plastic material 1b consisting of 20 parts by weight of an ethylene/ethyl acrylate copolymer and 80 parts by weight of polyethylene was melt-extruded in a 20 μm thickness and laminated on one side of a transparent plastic sheet 2a consisting of a 16-μm thick polyethylene terephthalate film to prepare a temporarily bonded, laminated sheet A. Then, the sheet A was coated on its both sides with transparent heat-sensitive adhesive layers 2c consisting of a hot-melt type of adhesives heat-bondable at 70° C. based on an ethylene/vinyl acetate copolymer, each in an amount of 25 $g/m^2$, thereby preparing a laminated sheet assembly 2. Apart from this, a Z-folding postcard formed by a continuous slip form weighing 72 $g/m^2$ was simultaneously printed with a recipient's address and items of confidential information, which included on at least one major side a first region 1a to bear an address and second regions 1b, 1c to bear confidential items of information, one 1b of said second regions 1b, 1c being folded back onto the back side of said first region 1a along a folding line X and the other 1c of said second regions 1b, 1c being folded back onto said one region 1b along a folding line Y located on the middle portion of and between said second regions 1b and 1c. The postcard form 1 was then Z-folded along the folding lines X and Y to insert the above laminated sheet assembly 2 and the adhesive sheet 3 of the same type as said assembly 2 between second regions 1b and 1c and between the back sides of the first region 1a and the one second region 1b. The postcard 1 was then passed between heated rolls with the surface temperatures lying between 100° C. and 120° C. lower than the melting point of the transparent plastic material 2b, thereby bonding said back sides together through the transparent adhesive layers 2c, followed by sufficient cooling. Afterwards, the T-peel strength between the second regions 1b and 1c of the postcard form 1 was measured at 20° C., and RH of 65% and a peel rate of 300 mm/min. As a result, it was found that they could easily be separated by hand from each other at 25 g/50 mm. It was ascertained that this postcard could be used as the "one-way" postcard, since the print faces were not damaged at all and so could be made out sufficiently.

EXAMPLE 2

The laminated sheet assembly 2 of the same type as prepared in Example 1 was prepared. Apart from this, a postcard form combination 1 comprising a continuous slip form weighing 160 $g/m^2$ was printed simultaneously with a recipient's address, items of confidential information and name of an addressor of a reply by means of a computer laser printer, said postcard form combination consisting of a Z-folding postcard form having on at least one major side a first region 1a to bear an address and second regions 1b, 1c to bear items of confidential information, one 1b of said second regions 1b, 1c being folded back onto the back side of said first region 1a along a folding line X and the other 1c of said second regions 1b, 1c being folded back onto said one second region 1b along a folding line Y located on the middle portion of and between said second regions 1b, 1c and a reply postcard form defining a third or reply region 1d contiguous to said other second region 1c through a folding line W along which it is folded back onto the back side of said other second region 1c. Afterwards, the postcard form combination 1 was folded up along the folding lines X, Y and W to insert the above laminated sheet assembly 2 between the second regions 1b and 1c and insert between the back sides of the first region 1a and the one second region 1b an adhesive sheet 3 consisting of a hot-melt type of adhesives based on an ethylene/vinyl acetate copolymer which is of the same type as that of the heat-sensitive adhesive layers 2c. Then, the postcard form combination 1 was passed between heated rolls with the surface temperatures between 100° C. and 120° C. and lower than the melting point of the transparent plastic material 2b, thereby bonding said back sides together through the heat-sensitive adhesive layers 2c and the adhesive sheet 3, followed by sufficient cooling. Afterwards, the T-peel strength between the second regions 1b and 1c was measured at 20° C., an RH of 65% and a peel rate of 300 mm/min. As a result, it was found that they could easily be separated by hand from each other at 25 g/50 mm; the print faces were not damaged at all and so could be clearly made out; the postcard form combination had a total weight of 10.6 g; and the reply postcard form comprising the third region 1*d* was 2 g. Thus, it was confirmed that this postcard form combination could be used for the "two-way" purposes.

COMPARATIVE EXAMPLE

In the same manners as in Example 1, a postcard form was obtained provided that a thermoplastic resin consisting of 40 parts by weight of an ethylene/ethyl acrylate copolymer and 60 parts by weight of polyethylene was used as the transparent plastic material 2*b* forming the temporarily bonded, laminated sheet A. As a result of measurement effected in the same manners as in Example 1, the T-peel strength between the second regions 1*b* and 1*c* was found to be 80 g/50 mm at 20° C., an RH of 65% and a peel rate of 300 mm/min., causing peel curling and making prints illegible.

According to the present invention as detailed above, the first region 1*a* to bear an address and the second regions 1*b*, 1*c* to bear items of confidential information and the reply region 1*d*, if any, lie on the same plane, so that the address and information and the name of addressor of a reply, if any, can be printed at the same time. Thus, the postcard of the present invention is unlikely to be wrongly addressed. Besides, the name of addressors of a reply can also be printed in the case of the reply postcard. The addressees, items of confidential information and the names of the addressors of replys, if a reply region 1*d* is available, can be printed by a computer at the same time.

The second regions 1*b* and 1*c* to bear items of confidential information has an area at least twice as large as an ordinary postcard; this means that the amount of information to be set down is at least doubled. Furthermore, they are thermally bonded together through the laminated sheet assembly 2 inserted therebetween and having the transparent heat-sensitive adhesive layers 2*c*, on both sides of the temporarily bonded, laminated sheet A, so that the confidential information-bearing regions 1*b* and 1*c* can be protected by the transparent heat-sensitive adhesive layers 2*c*. Thus, it is not only impossible to add or deduct something to or from the printed information or make some correction to it with malicious intent, but it is also possible to preserve it over an extended period of time. The recipient of this postcard can read the items of confidential information printed simply by peeling the plastic sheet 2*a* from the plastic material 2*b* by hand. This is because the peel strength of the plastic sheet 2*a* with respect to the plastic material 2*b* is 10–70 g/50 mm, as measured at 20° C., an RH of 65% and a peel rate of 300 mm/min without damaging the items of confidential information printed. Once the plastic sheet 2*a* has been peeled from the plastic material 2*b*, they can never be re-bonded together. This makes a great deal of contribution to preventing an invasion of privacy. Currently available postcards leave a large amount of peel papers after treatments for concealing the confidential information-bearing sides, giving rise to a pollution problem which is completely eliminated by the present invention. Moreover, since heat-sensitive adhesive layers 2*c* on both sides of the laminated sheet assembly 2 are thermally bondable at a temperature lower than the melting points of the transparent plastic sheet 2*a* and material 2*b* forming the temporarily bonded, laminated sheet A by at least 10° C., the T-peel strength of the sheet A is unlikely to change due to the thermal bonding of the laminated sheet assembly 2 to the postcard form or postcard form combination 1.

Having such advantages as mentioned above, the (reply) postcard for confidential purposes according to the present invention makes a beneficial contribution to sending large quantities of confidential papers likely to pose an invasion-of-privacy problem.

We claim:

1. A postcard for confidential purposes comprising:
   - an S- or Z-folding, continuous postcard form (1) having on at least one major side a first region (1*a*) to bear an address and second regions (1*b*, 1*c*) to bear items of confidential information both printed by laser printer, one (1*b*) of said second regions (1*b*, 1*c*) being folded back onto the back side of said first region (1*a*) along a folding line (X) and the other (1*c*) of said second regions (1*b*, 1*c*) being folded back onto said one region (1*b*) along a folding line (Y) located on the middle portion of and between said second regions (1*b* and 1*c*);
   - a laminated sheet assembly (2) including a temporarily bonded, laminated sheet (A) consisting of a transparent plastic sheet (2*a*) and a transparent plastic material (2*b*) melt-extruded on one side of said plastic sheet (2*a*), said plastic material (2*b*) showing a T-peel resistance of 10 to 70 g/50 mm with respect to said plastic sheet (2*a*), as measured at 20° C., an RH of 65% and a peeling speed of 300 mm/min. and two heat-sensitive adhesive layers (2*c*) provided on the two sides of said laminated sheet (A), each of said layers (2*c*) showing a T-peel resistance higher than 300 g/50 mm with respect to said plastic sheet (2*a*), said plastic material (2*b*) and said postcard form (1), as measured at 20° C., an RH of 65% and a peeling speed of 300 mm/min. and being thermally bondable to said postcard form (1) at a temperature lower than 100° C., and
   - said laminated sheet assembly (2) being inserted between said second regions (1*b* and 1*c*) and thermally bonded by the heat-adhesive layers (2*c*) to the regions (1*b* and 1*c*), so that said regions (1*b* and 1*c*) are temporarily bonded together by the layers (2*a*) and (2*b*); and
   - an adhesive sheet (3) inserted between the back sides of said first region (1*a*) and said one (1*b*) of said second regions (1*b*, 1*c*) so that they are thermally bonded together.

2. A postcard as recited in claim 1, wherein said transparent plastic film (2*a*) of said temporarily bonded, laminated sheet (A) is formed of any one of polyethylene terephthalate, polypropylene and acetate, and said transparent plastic material (2*b*) is formed of any one of an ethylene/ethyl acrylate copolymer and/or an ethylene/vinyl acetate copolymer or an mixed resin of an ethylene/ethyl acrylate copolymer and/or an ethylene/vinyl acetate copolymer with polyethylene.

3. A postcard as recited in claim 1 or 2, wherein said transparent heat-sensitive adhesive layers (2*c*) on both sides of said laminated sheet assembly (2) is formed of any one of materials based on an acrylic material, ionomers and vinyl chloride/vinyl acetate, ethylene/vinyl acetate, ethylene/acrylic acid, styrene/butadiene/styrene, styrene/isoprene/styrene and styrene/ethylenebutylene/styrene copolymers.

4. A postcard as recited in any one of claims 1 or 2, wherein said adhesive sheet (3) is formed of the same material of which said laminated sheet assembly (2) is formed.

5. A postcard as recited in any one of claims 1 or 2, wherein said adhesive sheet (3) is formed of the same material of which said heat-sensitive adhesive layers (2c) on both sides of said laminated sheet assembly (2) are formed.

6. A postcard as recited in any one of claims 1 or 2, wherein said postcard form (1) includes on its both sides ear regions (1e), each having a line of equally spaced small holes, through perforations (P), such that said first regions (1a) and said second regions (1b, 1c) are printed at the same time with a computer printer.

7. A reply postcard for confidential purposes comprising:

a postcard form combination (1) consisting of a Z-folding postcard form having on at least one major side a first region (1a) to bear an address and second regions (1b, 1c) to bear items of confidential information both printed by laser printer, one (1b) of said second region (1b, 1c,) being folded back onto the back side of said first region (1a) along a folding line (X) and the other (1c) of said second regions (1b, 1c) being folded back onto said one second region (1b) along a folding line (Y) located on the middle portion of and between second regions (1b and 1c) and a replay postcard form defining a third or reply region (1d) contiguous to the other (1c) of said regions (1b, 1c) which is folded back onto the back side of said other second region (1c) along a folding line (W);

a laminated sheet assembly (2) including a temporarily bonded, laminated sheet (A) consisting of a transparent plastic sheet (2a) and a transparent plastic material (2b) melt-extruded on one side of said plastic sheet (2a), said plastic material (2b) showing a T-peel resistance of 10 to 70 g/50 mm with respect to said plastic sheet (2a), as measured at 20° C., an RH of 65% and a peeling speed of 300 mm/min. and two heat-sensitive adhesive layers (2c) provided on the two sides of said laminated sheet (A), each of said layers (2c) showing a T-peel resistance higher than 300 g/50 mm with respect to said plastic sheet (2a), said plastic material (2b) and said postcard form combination (1), as measured at 20° C., an RH of 65% and a peeling speed of 300 mm/min. and being thermally bondable to said postcard form combination (1) at a temperature lower than 100° C., and said laminated sheet assembly (2) being inserted between said second regions (1b and 1c) and thermally bonded by the heat-adhesive layers (2c) to the second regions (1b and 1c), so that said regions (1b and 1c) are temporarily bonded together by the layers (2a) and (2b); and an adhesive sheet (3) inserted between the back sides of said first region (1a) and said one (1b) of said second regions (1b, 1c) so that they are thermally bonded together.

8. A reply postcard as recited in claim 7, wherein said transparent plastic film (2a) of said temporarily bonded, laminated sheet (A) is formed of any one of polyethylene terephthalate, polypropylene and acetate, and said transparent plastic material (2b) is formed of any one of an ethylene/ethyl acrylate copolymer and/or an ethylene/vinyl acetate copolymer or an mixed resin of an ethylene/ethyl acrylate copolymer and/or an ethylene/vinyl acetate copolymer with polyethylene.

9. A reply postcard as recited in claim 7 or 8, wherein said transparent heat-sensitive adhesive layers (2c) on both sides of said laminated sheet assembly (2) is formed of any one of materials based on an acrylic material, ionomers and copolymers of vinyl chloride/vinyl acetate, ethylene/vinyl acetate, ethylene/acrylic acid, styrene/butadiene/styrene, styrene/isoprene/styrene and styrene/ethylenebutylene/styrene.

10. A reply postcard as recited in any one of claims 7 or 8, wherein said adhesive sheet (3) is formed of the same material of which said laminated sheet assembly (2) is formed.

11. A reply postcard as recited in any one of claims 7 or 8, wherein said adhesive sheet (3) is formed of the same material of which said heat-sensitive adhesive layers (2c) on both sides of said laminated sheet assembly (2) are formed.

12. A reply postcard as recited in any one of claims 7 or 8, wherein said postcard form combination (1) includes on its both sides ear regions (1e), each having a line of equally spaced small holes, through perforations (P), such that said first regions (1a), said second regions (1b, 1c) and reply region (1d) are printed at the same time with a computer printer.

* * * * *